(No Model.)  2 Sheets—Sheet 1.
E. ZIEGLER.
Lime and Cement Kiln.
No. 241,268. Patented May 10, 1881.
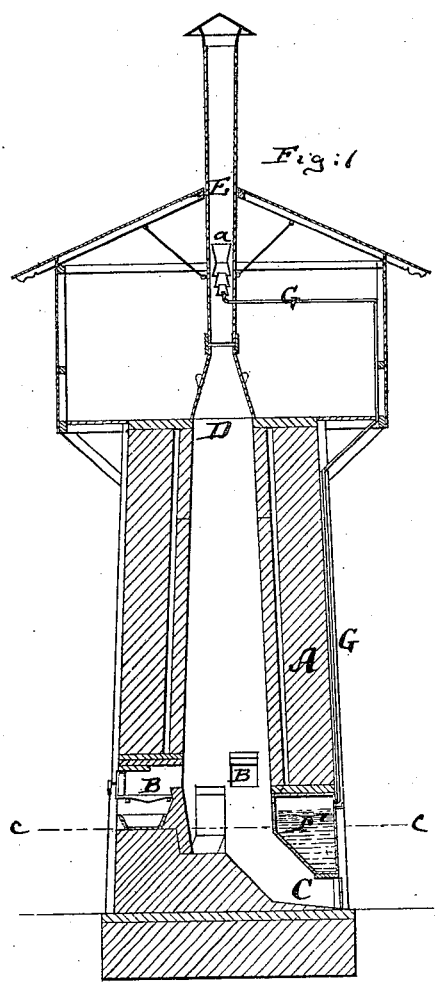
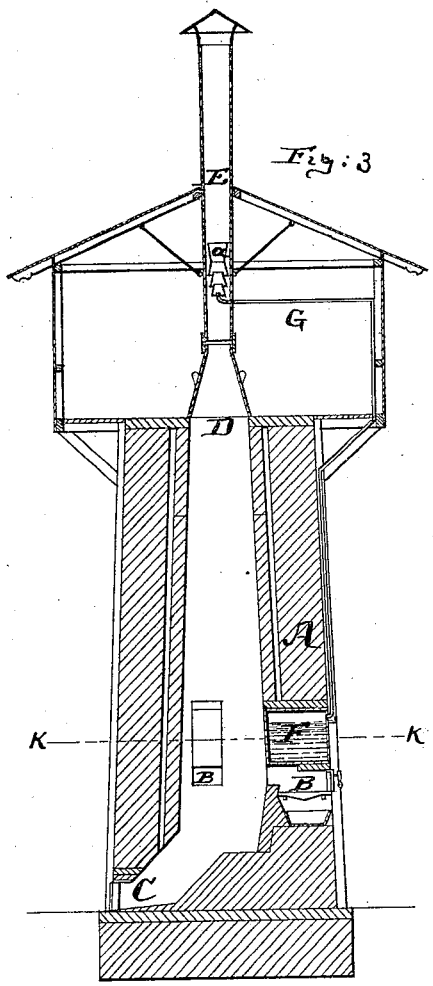
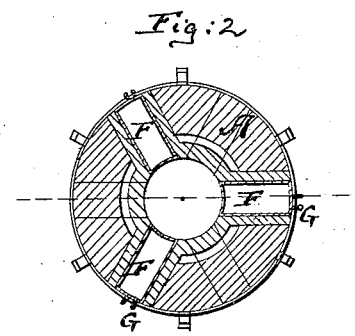
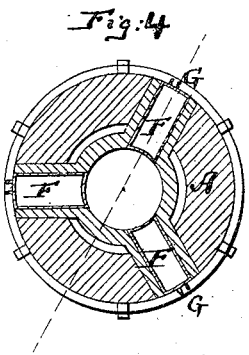
WITNESSES  
H. F. Parker  
John C. Tunbridge
INVENTOR  
Ernst Ziegler  
by his attorney  
A. v. Briesen (No Model.) 2 Sheets—Sheet 2.
E. ZIEGLER.
Lime and Cement Kiln.
No. 241,268. Patented May 10, 1881.
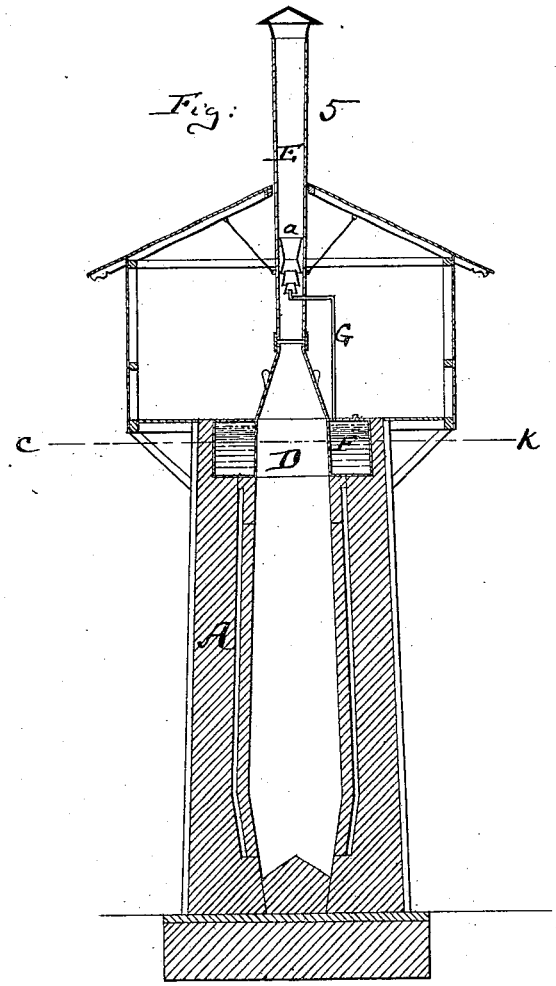
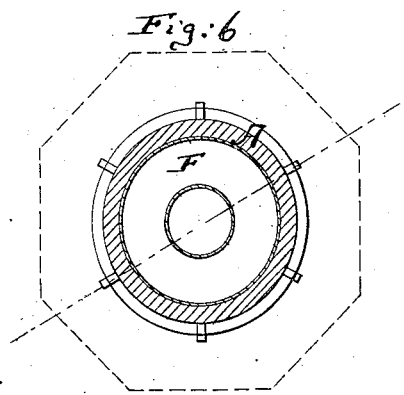
WITNESSES.
H. F. Parker
John C. Tunbridge
INVENTOR.
Ernst Ziegler
by his attorney
A. v. Briesen

UNITED STATES PATENT OFFICE.

ERNST ZIEGLER, OF HEILBRONN-ON-NECKAR, GERMANY.

LIME AND CEMENT KILN.

SPECIFICATION forming part of Letters Patent No. 241,268, dated May 10, 1881.

Application filed September 6, 1880. (No model.) Patented in Germany July 29, 1879.

*To all whom it may concern:*

Be it known that I, ERNST ZIEGLER, of Heilbronn-on-Neckar, Würtemberg, in the Empire of Germany, have invented an Improvement in Lime and Cement Kilns, (for which I have received German Letters Patent, No. 9,123, for fifteen years, dated July 29, 1879,) of which the following is a specification.

Figure 1 is a central vertical section of my improved lime or cement kiln. Fig. 2 is a horizontal section of the same on line $c\ c$, Fig. 1. Fig. 3 is a central vertical section of a modification of the same; Fig. 4, a horizontal section thereof on the line $k\ k$, Fig. 3. Fig. 5 is a central vertical section of still another modification thereof. Fig. 6 is a horizontal section thereof on line $c\ k$, Fig. 5.

This invention relates to a new lime or cement kiln which contains a steam-generator, so that the heat ordinarily required in such kilns will also be utilized to generate steam, which is used to assist in discharging the carbonic-acid gas from the glowing or burning lime or cement.

In the drawings, A is the body of the kiln. B B are the grate and fuel chambers; C C, the outlet-openings for the discharge of the lime or cement; D, the top opening of shaft. E is the chimney. F F are the steam-generators, of suitable construction. They are either placed over the fire-chamber, as in Figs. 3 and 4, or over the openings C, as in Figs. 1 and 2, or one such generator, of annular or other form, may be placed in the upper part of the furnace, as in Figs. 5 and 6. In either case the said generators are built into the furnace, exposed to the heat therein produced, and capable of utilizing part of said heat for generating steam, which is conducted, through suitable pipes G, from said generator into nozzles $a\ a$, that are placed into the chimney to increase the draft. Other pipes may lead from said generators under the grates to carry steam to the fire for assisting in the combustion of the fuel, and a pipe may also be conducted into the lower part of the furnace to carry steam to the lime or cement as a blast, or for rarefying the air.

I claim—

The lime or cement furnace A, combined and provided with one or more steam-generators, F, that are built into said furnace and heated by the same, and with pipes G leading from said generators, and with nozzles $a$, into which said pipes lead, said nozzles being contained within the smoke-flue E of said furnace, substantially as specified.

In testimony whereof I have signed my name to this specification in the presence of two subscribing witnesses.

ERNST ZIEGLER.

Witnesses:
 FRIED. G. ZIEGLER,
 CH. ZELLER.